United States Patent
Klein et al.

(10) Patent No.: US 8,602,561 B2
(45) Date of Patent: Dec. 10, 2013

(54) THREE-DIMENSIONAL PROJECTION DEVICE

(75) Inventors: Edwin Jan Klein, Enschede (NL); Ronald Dekker, Enschede (NL)

(73) Assignee: Octrolix BV (NL)

( * ) Notice: Subject to any disclaimer, the term of this patent is extended or adjusted under 35 U.S.C. 154(b) by 277 days.

(21) Appl. No.: 13/228,684

(22) Filed: Sep. 9, 2011

(65) Prior Publication Data

US 2012/0044459 A1 Feb. 23, 2012

Related U.S. Application Data

(63) Continuation-in-part of application No. 13/208,806, filed on Aug. 12, 2011.

(60) Provisional application No. 61/381,185, filed on Sep. 9, 2010, provisional application No. 61/344,553, filed on Aug. 19, 2010, provisional application No. 61/376,483, filed on Aug. 24, 2010, provisional application No. 61/477,960, filed on Apr. 21, 2011.

(51) Int. Cl.
*G02B 27/26* (2006.01)

(52) U.S. Cl.
USPC .................. 353/8; 353/20; 385/133; 385/901

(58) Field of Classification Search
USPC .......................... 353/8, 20, 121; 385/133, 901
See application file for complete search history.

(56) References Cited

U.S. PATENT DOCUMENTS

| | | | |
|---|---|---|---|
| 4,146,297 A | 3/1979 | Alferness et al. | |
| 5,802,222 A | 9/1998 | Rasch et al. | |
| 7,413,311 B2 * | 8/2008 | Govorkov et al. | 353/34 |
| 7,575,326 B2 * | 8/2009 | Nishida et al. | 353/20 |
| 7,978,189 B2 | 7/2011 | Sprague et al. | |
| 2002/0037126 A1 | 3/2002 | Martinelli et al. | |
| 2003/0223672 A1 | 12/2003 | Joyner et al. | |
| 2008/0004525 A1 | 1/2008 | Goldman et al. | |
| 2008/0027317 A1 | 1/2008 | Wood et al. | |
| 2009/0079941 A1 | 3/2009 | Miller et al. | |

FOREIGN PATENT DOCUMENTS

| | | |
|---|---|---|
| EP | 1022913 A2 | 7/2000 |
| KR | 20080010752 A | 1/2008 |
| WO | 2009134691 A1 | 11/2009 |

OTHER PUBLICATIONS

Mangeat et al., "Integrated polarization rotator made of periodic asymmetric buried Ta2O5/silica sol-gel waveguides", "Optics Express", Sep. 17, 2007, pp. 12436-12442, vol. 15, No. 19, Publisher: Optical Society of America, Published in: US.

Shani et al., "Polarization rotation in asymmetric peiodic loaded rib waveguides", "Applied Physics Letters", Sep. 9, 1991, pp. 1278-1280, vol. 59, No. 11, Publisher: American Institute of Physics, Published in: US.

(Continued)

*Primary Examiner* — Tony Ko
(74) *Attorney, Agent, or Firm* — Kaplan Breyer Schwarz & Ottesen, LLP

(57) ABSTRACT

An image projection system having a laser projector that projects two differently polarized images on a display region is disclosed. The laser projector enables viewing the two differently polarized images as a three-dimensional image. The image projection system includes a planar lightwave circuit-based beam combiner that enables multiple colors of laser light having different polarization modes to be combined in a single output beam that is scanned over the display region at video rates to produce the two polarized images.

28 Claims, 10 Drawing Sheets

(56) References Cited

OTHER PUBLICATIONS

Davids et al., "Surface plasmon induced polarization rotation and optical vorticity in a single mode waveguide", "Optics Express", Jul. 23, 2007, pp. 9476-9485, vol. 15, No. 15, Publisher: Optical Society of America, Published in: US.

Anna Maria Frisch, "Related EP Paten Application No. EP 12 18 3550 Search Report", Jun. 28, 2013, Publisher: EPO, Published in: EP.

* cited by examiner

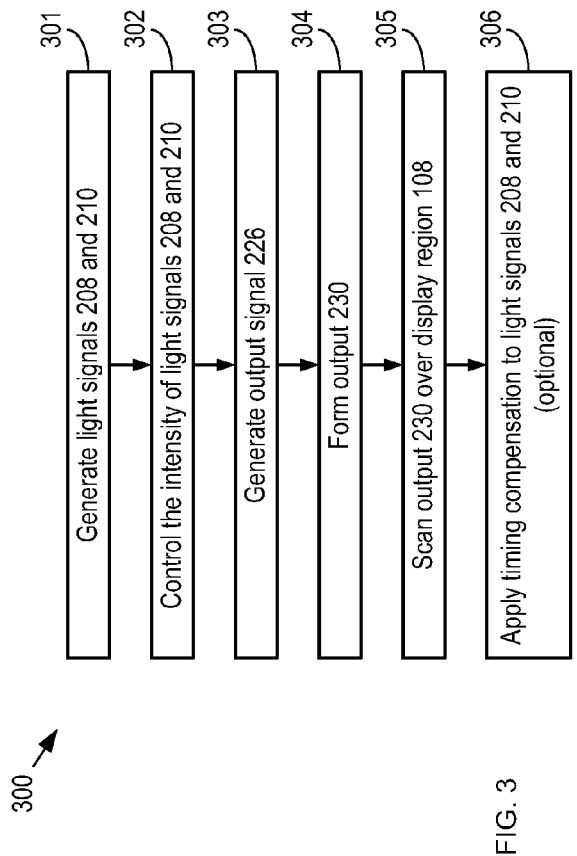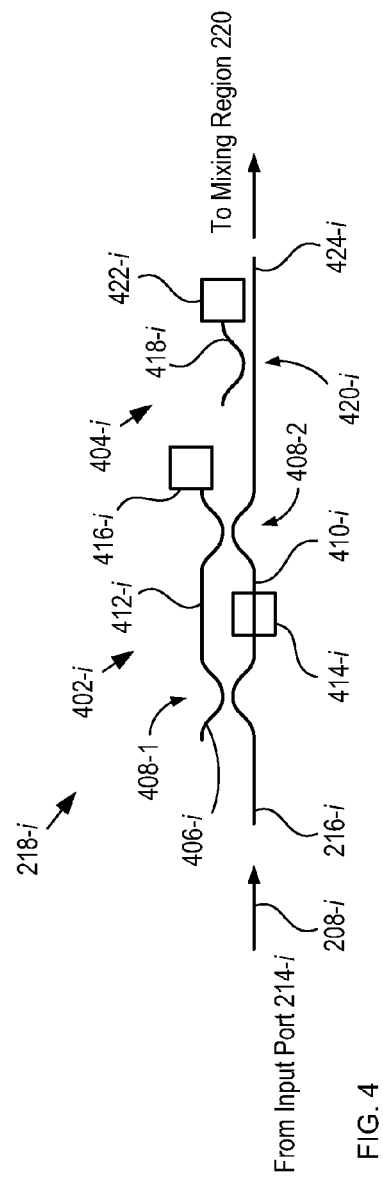

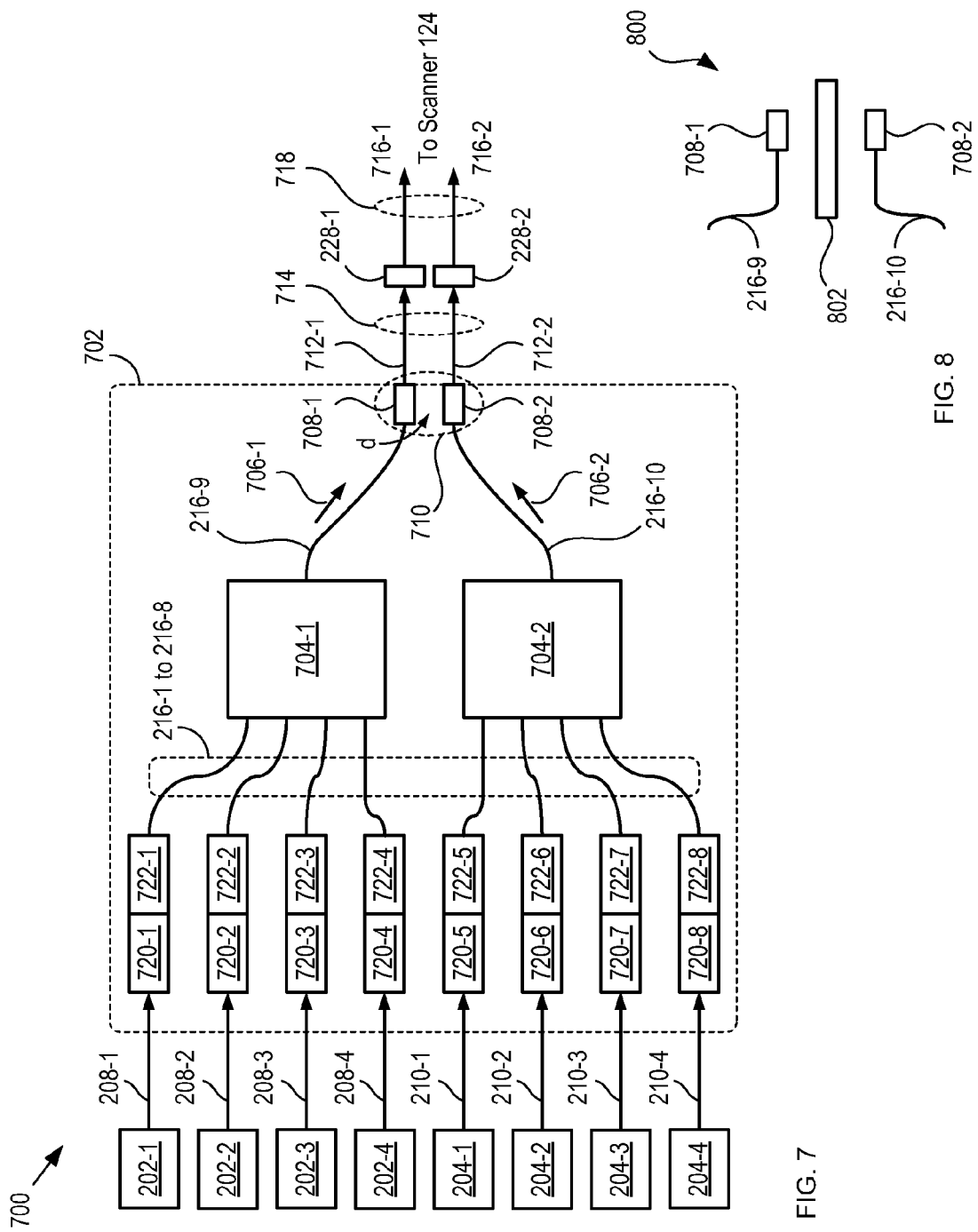

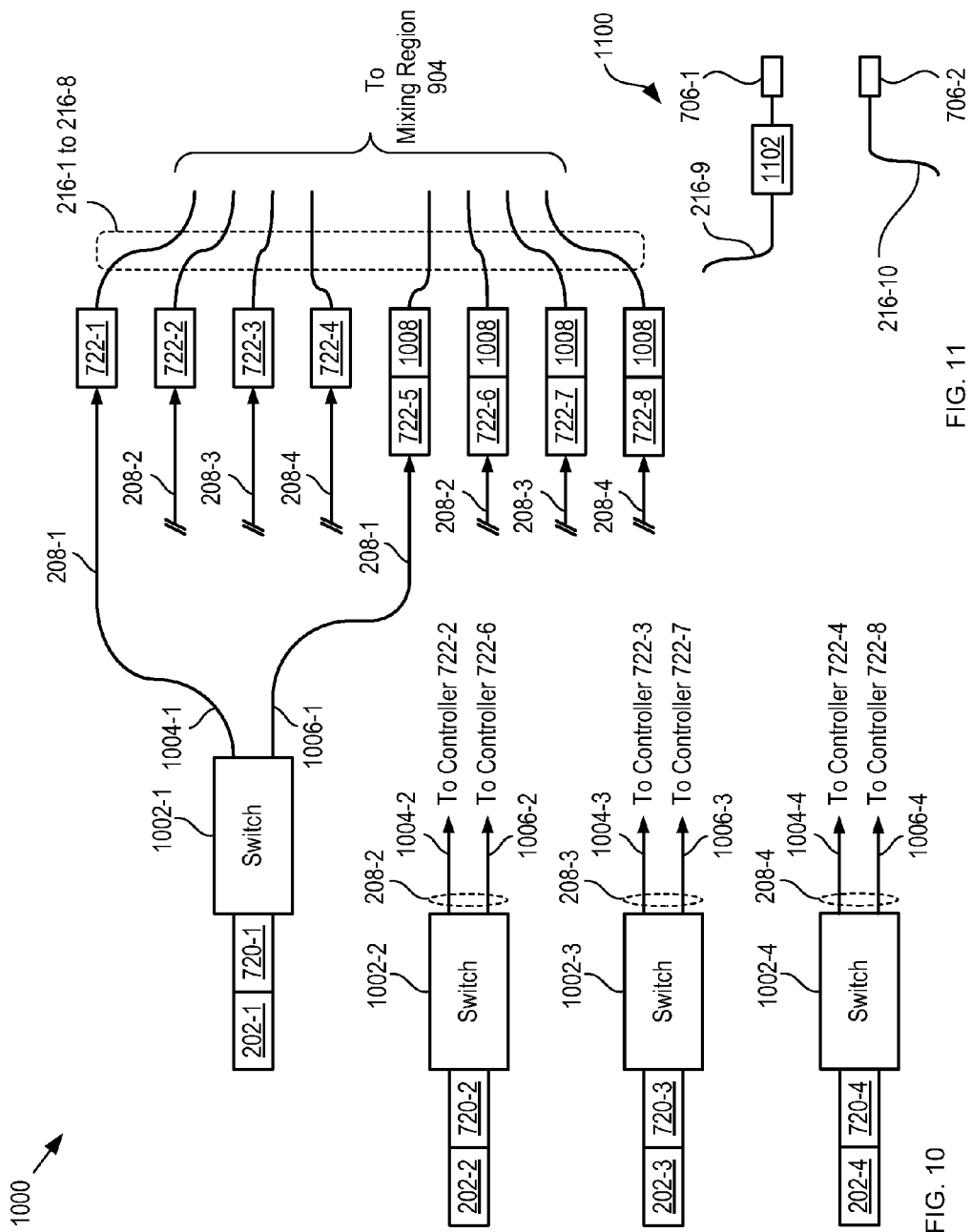

THREE-DIMENSIONAL PROJECTION DEVICE

CROSS REFERENCE TO RELATED APPLICATIONS

This case is a continuation-in-part of co-pending U.S. patent application Ser. No. 13/208,806, entitled "Beam Combiner," filed Aug. 12, 2011, which claims the benefit of U.S. Provisional Application Ser. No. 61/344,553, filed Aug. 19, 2010, U.S. Provisional Application Ser. No. 61/376,483, filed Aug. 24, 2010, and U.S. Provisional Application Ser. No. 61/477,960, filed Apr. 21, 2011. This case also claims the benefit of U.S. Patent Application 61/381,185, filed Sep. 9, 2010. All of these cases are incorporated herein by reference If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to projectors in general, and, more particularly, to three-dimensional projectors.

BACKGROUND OF THE INVENTION

Systems for displaying images that appear three-dimensional ("3D") have been available for many years. Typically, in order to create a 3D image, two separate single color, two-dimensional images are projected onto a screen, which is viewed by a viewer wearing goggles or glasses having right and left color filters. The right filter passes the first color (e.g. red) of the image to the right eye while the left filter blocks the red light from reaching the left eye. Meanwhile, the left filter passes the other color (e.g., blue) to the left eye while the right filter blocks the blue light from reaching the right eye. As a result, the viewer's eyes see different images, which the brain interprets as a single image having depth (i.e., the third dimension).

An alternative technique for displaying a 3D image projects two separate images, each having a different polarization mode, on the screen. In this case, the viewer's glasses have polarization filters that enable slightly different images to reach the viewer's eyes. As with color-based projection systems, the viewer's brain interprets the different images as a single image having depth. Polarization-based 3D projection systems typically provide better color reproduction than color-based 3D projection systems; however, the polarization filters block as much as 50% of the light reaching each eye. As a result, the images are typically projected at high intensity to offset the loss.

Unfortunately, conventional 3D projection systems are typically large, expensive, and include optical systems that require complex alignment to attain and maintain quality images. As a result, an improved 3D projection system that is cheaper to make, smaller, optically efficient, and less complex is desirable.

SUMMARY OF THE INVENTION

The present invention enables a 3D projector without some of the costs and disadvantages of the prior art. Embodiments of the present invention include a beam combiner that is based on planar-lightwave circuit technology, which enables projectors that are smaller, cheaper, and more robust. In addition, some embodiments of the present invention enable control over the intensity of each individual light signal within the projected image via attenuators formed within the planar lightwave circuitry itself.

An illustrative embodiment of the present invention includes a light engine that is formed by hybrid integration of a plurality of light sources on a substrate that comprises a planar lightwave circuit-based beam combiner. The light sources provide a first plurality of TE-polarized light signals and a second plurality of TM-polarized light signals that are received by input ports of the beam combiner. The beam combiner includes a mixing region that has a plurality of directional couplers arranged in a tree arrangement, wherein the directional couplers are dimensioned and arranged to enable all of the light signals to be coupled onto the same output waveguide as a composite output signal. The output waveguide conveys the composite output signal to an output port, where it is collimated by a collimating lens to form an output beam. The output beam is received by a scanner, such as a MEMS-based two-axis scanning mirror, which scans the output beam over a display region.

Another embodiment of the present invention comprises a light engine that includes: a first plurality of light sources, each of which provides a light signal of a different color and that is TE-polarized; a second plurality of light sources, each of which provides a light signal of a different color and that is TM-polarized; and a beam combiner that is based on planar lightwave circuit technology, wherein all of the light sources are disposed directly on the beam combiner. The TE-polarized light signals are combined in a first mixing region to form a first multi-color composite output signal that is TE-polarized, while the TM-polarized light signals are combined in a second mixing region to form a second multi-color composite output signal that is TM-polarized. The two composite output signals are then combined in a third mixing region and provided as a third composite output signal at an output port of the beam combiner. This third composite output signal is then provided as an output signal, which is substantially collimated by a collimating lens to form an output beam. The output beam is scanned over a display region via a scanning mirror, which scans the beam at a video rate to generate a multi-color image having two differently polarized components. These components are suitable for viewing with eyewear having different polarization filters in the left and right lenses, as in a conventional 3D projection system.

In some embodiments, the first and second composite output signals are not combined in a third mixing region. Instead, each of the first and second composite output signals is provided at an output port having two waveguides and output facets. At the output port, the first and second composite output signals are collimated and provided as separate output beams that collectively define the output signal. The two output beams are substantially parallel and in close proximity; therefore, they appear as a single spot when scanned over the display region. In some of these embodiments, each of the two waveguides of the output port are characterized by an increased refractive-index contrast that increases their optical-mode confinement, thus mitigating optical cross talk between the waveguides. In some of these embodiments, a trench interposes the two waveguides of the output port to enhance the optical isolation between the waveguides.

In some embodiments, the beam combiner comprises a plurality of waveguides that do not define mixing regions. Instead, the waveguides receive the light signals having different colors and polarizations at a first end of the beam combiner where the waveguides have a relatively wide pitch to accommodate their optically coupling with individual light sources. The waveguides convey the independent light signals to a second end of the beam combiner where the waveguides have a relatively narrow pitch, preferably less than 10 microns. At the second end, each light signal is collimated independently to provide a separate output beam, which collectively define an output signal. Since the individual beams that compose the output signal are so close together, they blend to form a single pixel. This output signal is received by the scanner and scanned over the display region. In some embodiments, the timing of the emissions of the light sources is adjusted to accommodate delays that occur between the arrivals of the individual beams at each pixel in the display region.

In some embodiments, attenuators formed as part of the planar lightwave circuits control the ratio of the intensities of the light signals in the composite output signal. As a result, direct modulation of laser sources is avoided.

In some embodiments, each light signal received by the beam combiner is provided by a different light source. In some embodiments, each light signal of a different color is provided by a different light source and these light signals are split and converted to provide the two polarization modes of each color.

An embodiment of the present invention comprises a projector comprising: a beam combiner comprising a plurality of waveguides that are high-contrast surface waveguides, the plurality of waveguides being monolithically integrated, and the plurality of waveguides being arranged to define a first plurality of input ports that receive a first plurality of light signals having a first polarization, a second plurality of input ports that receive a second plurality of light signals that have a second polarization, a mixing region, and an output port, the output port providing an output signal comprising the first plurality of light signals and the second plurality of light signals; and a scanner that receives the output signal and scans it over a display region.

BRIEF DESCRIPTION OF THE DRAWINGS

FIG. 3 depicts operations of a method for projecting a 3D image in accordance with the illustrative embodiment.

FIG. 4 depicts a schematic drawing of a power controller in accordance with the illustrative embodiment of the present invention.

FIG. 7 depicts a schematic drawing of a light engine in accordance with a first alternative embodiment of the present invention.

FIG. 8 depicts a schematic drawing of an output port in accordance with a second alternative embodiment of the present invention.

FIG. 10 depicts a schematic drawing of an input stage of a light engine in accordance with a fourth alternative embodiment of the present invention.

FIG. 11 depicts a schematic drawing of an output port in accordance with a fifth alternative embodiment of the present invention.

DETAILED DESCRIPTION

The following terms are defined for use in this Specification, including the appended claims:

Planar lightwave circuit ("PLC") is defined as an optical circuit that comprises one or more monolithically integrated surface waveguide structures that guide light in two dimensions, wherein the surface waveguides are arranged to provide at least one optical function.

High-contrast waveguide is defined as a surface waveguide characterized by a large difference ($\geq 10\%$) between the refractive index of its core material and the refractive index of its cladding material.

Figure 1:
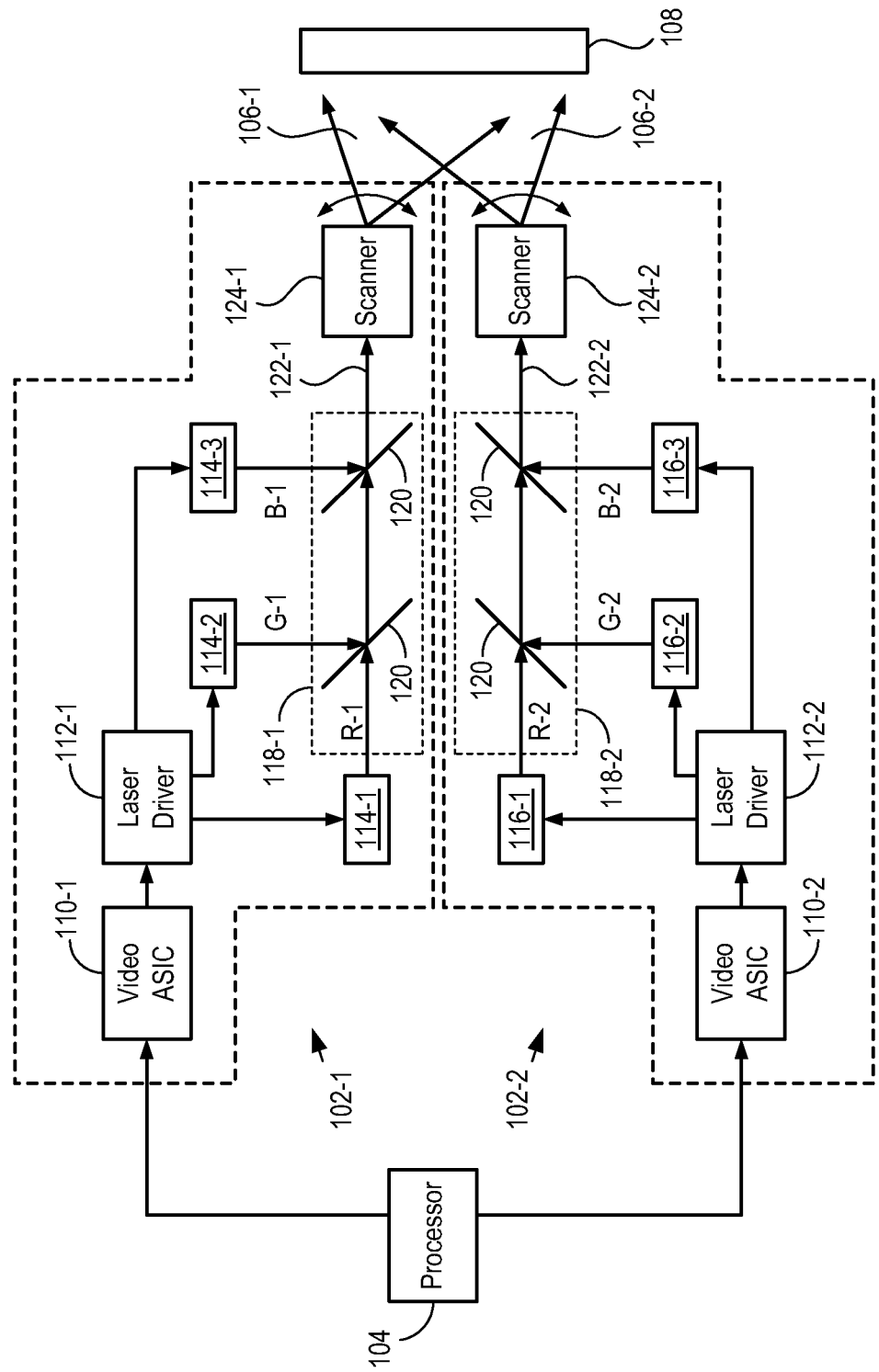
FIG. 1 depicts a schematic diagram of a portion of a 3D projector in accordance with the prior art.

FIG. 1 depicts a schematic diagram of a portion of a 3D projector in accordance with the prior art. Projector 100 projects two distinct, substantially co-located, two-dimensional images onto display region 108, wherein each of the images has a different polarization state. When viewed using glasses that include different polarization filters in each lens, the images appear to have depth, thereby adding a third dimension, as described in U.S. Patent Application Publication 2009/0079941, published Mar. 26, 2009, which is incorporated herein by reference. Projector 100 comprises photonics modules 102-1 and 102-2 and processor 104.

Processor 104 includes standard electronics for interfacing with a digital device, such as a cell phone, personal digital assistant (PDA), computer, game console or controller, and the like, to obtain image and/or video data. Processor 104 provides the data to each of photonics modules 102-1 and 102-2. Photonics modules 102-1 and 102-2 project images 106-1 and 106-2 onto display region 108. Images 106-1 and 106-2 are slightly different from one another to facilitate their interpretation as a 3D image.

Photonic module 102-1 includes video ASIC 110-1, laser driver 112-1, light sources 114-1, 114-2, and 114-3, beam combiner 118-1, and scanner 124-1.

Photonics module 102-2 includes video ASIC 110-2, laser driver 112-2, light sources 116-1, 116-2, and 116-3, beam combiner 118-2, and scanner 124-2.

Photonics modules 102-1 and 102-2 are substantially identical, except for the polarization of the light in the image they project. Light sources 114-1, 114-2, and 114-3 provided TE-polarized red, green, and blue light (designated as R-1, G-1, and B-1), respectively. Light sources 116-1, 116-2, and 116-3 provided TM-polarized red, green, and blue light (designated as R-2, G-2, and B-2), respectively. In some prior-art projection systems, light sources 114-1, 114-2, and 114-3 provide right-circular polarized light while light sources 116-1, 116-2, and 116-3 provide left-circular polarized light.

In operation, at photonics module 102-1, data from video ASIC 110-1 is converted into drive signals at laser driver 112-1 to drive light sources 114-1, 114-2, and 114-3 at appropriate levels. Light sources 114-1, 114-2, and 114-3 provide collimated beams of light to beam combiner 118-1. Beam combiner 118-1 combines the individual collimated beams of light, via wavelength-selective fold mirrors 120, into a composite output beam 122-1.

In similar fashion, at photonics module 102-2, data from video ASIC 110-2 is converted into drive signals at laser driver 112-2 to drive light sources 116-1, 116-2, and 116-3 at appropriate levels. Light sources 116-1, 116-2, and 116-3 provide collimated beams of light to beam combiner 118-2. Beam combiner 118-2 combines the individual collimated beams of light, via wavelength-selective fold mirrors 120, into a composite output beam 122-2. Wavelength-selective fold mirrors are typically dichroic mirrors that reflect some wavelengths of light but transmit other wavelengths of light. They are oriented so that they redirect the reflected light signal onto the path of the transmitted light signal to combine the two light signals into a single free-space beam.

Composite output beam 122-1 is scanned across display region 108 by scanning mirror 124-1 to form two-dimensional TE-polarized image 106-1. Simultaneously, scanning mirror 124-2 scans composite output beam 122-2 across the same region to form overlapping two-dimensional TM-polarized image 106-2. The two overlapping images are viewed by a user through glasses or goggles whose lenses are selectively polarized, one lens being polarized for the TE mode and the other lens being polarized for the TM mode.

Unfortunately, projector systems based on free-space beam combiners are beset by several drawbacks. First, free-space beam combiners require optical elements that are relatively large and bulky and require mounting fixtures to attain and maintain their relative alignment. Resultant projector systems, therefore, become large, bulky, and expensive.

Second, free-space beam combiners convey light through a medium (e.g., air, glass, etc.) that provides no light-guiding capability. As a result, the input light signals are typically individually collimated prior to their entry into the beam combiner to ensure that each beam has substantially the same cross-sectional shape when combined. Such collimating optics adds significant system cost and complexity.

Third, the assembly of the optical elements and light sources of a free-space beam combiner is typically highly labor intensive. The components must be carefully aligned in both position and angle to ensure that the constituent light signals are completely overlapping to avoid spectral non-uniformity through the cross-section of the composite output beam. In addition, angular misalignment of one or more of constituent light signals can lead to divergence of those light signals as they propagate through the beam combiner. The assembly of these optical elements becomes increasingly more difficult as additional light signals are included. Further, high-speed volume manufacture of free-space beam combiners is difficult in a cost-effective manner. Still further, the sources, mirrors, and lenses are normally aligned and positioned by mounting them in an optical fixture. Unfortunately, such fixtures are susceptible to temperature-induced misalignments (due to thermal expansion), as well as misalignments caused by shock and vibration that commonly occur through the lifetime of the projector.

Fourth, geometric distortion of the constituent light signals occurs at each turning mirror in the beam combiner due to a difference in their angle of incidence in the x- and y-directions with the mirrors. As a result, compensating optics are typically included in the beam combiner, further increasing cost, system complexity, and system size.

Fifth, conventional laser projectors rely on direct modulation of the laser sources to control the color of the composite output signal. Unfortunately, changing the drive current to a laser diode can lead to deleterious optical effects, such as wavelength chirping and mode hopping that manifest as unwanted visible artifacts in the projected image. In addition, some laser sources, such as frequency-doubled lasers or diode-pumped solid-state lasers, cannot be controlled using direct current drive modulation and, therefore, rely upon external modulators, such as acousto-optic modulators, to control their output. External modulation adds significant complexity and expense to such systems.

In contrast to projectors of the prior art, 3D projectors in accordance with the present invention employ beam combiners based on PLCs having directional couplers (a.k.a. filters) that enable highly efficient combining of multiple colors and multiple polarizations of light. Further, beam combiners in accordance with the present invention enable a single composite light signal to be formed by combining light signals of disparate irregularly spaced wavelengths over a wide wavelength range.

Figure 2:
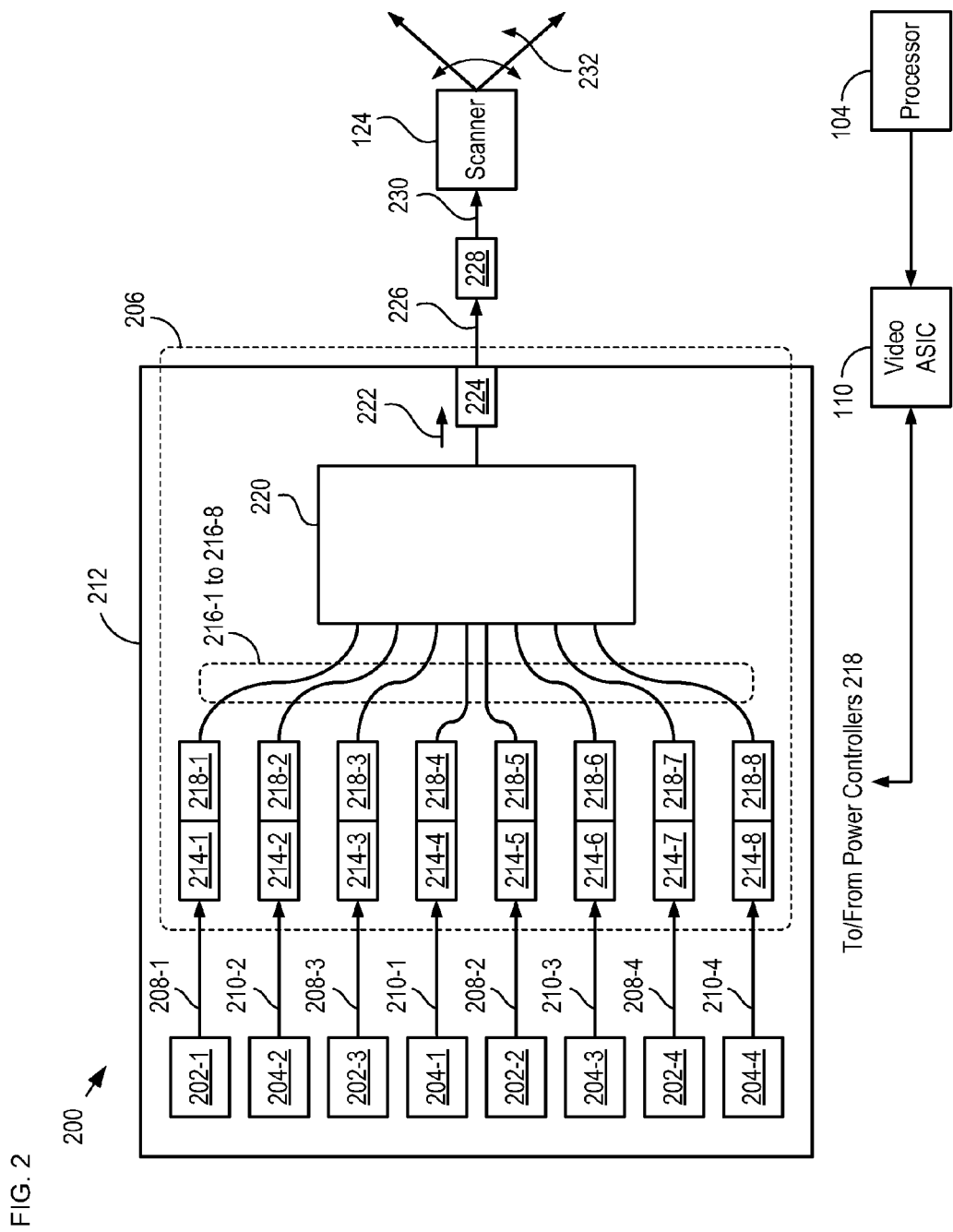
FIG. 2 depicts a schematic drawing of a 3D projector in accordance with an illustrative embodiment of the present invention.

FIG. 2 depicts a schematic drawing of a 3D projector in accordance with an illustrative embodiment of the present invention. Projector 200 comprises light sources 202-1 through 202-4, light sources 204-1 through 204-4, beam combiner 206, optics 228, scanner 124, processor 104, and video ASIC 110.

FIG. 3 depicts operations of a method for projecting a 3D image in accordance with the illustrative embodiment. Method 300 begins with operation 301, wherein light sources 202-1 through 202-4 provide TE-polarized light signals and 204-1 through 204-4 and TM-polarized light signals to beam combiner 206.

Light sources 202-1 through 202-4 (referred to, collectively, as light sources 202) are laser diodes that are dimensioned and arranged to provide light signals 208-1, 208-2, 208-3, and 208-4. Light signals 208-1, 208-2, 208-3, and 208-4 (referred to, collectively, as light signals 208) are TE-polarized red, green, blue, and yellow light signals, respectively. Although a full-color image can be projected with just red, green, and blue light signals, yellow light is included in the illustrative embodiment to increase the sharpness of the projected image. In some embodiments, yellow light is not included. In some embodiments, one or more additional wavelengths are optionally included with the red, green, and blue light signals, such as yellow, near-IR, ultra-violet, and the like.

Light sources 204-1 through 204-4 (referred to, collectively, as light sources 204) are laser diodes that are dimensioned and arranged to provide signals 210-1, 210-2, 210-3, and 210-4. Light signals 210-1, 210-2, 210-3, and 210-4 (referred to, collectively, as light signals 210) are TM-polarized red, green, blue, and yellow light signals, respectively.

At operation 302, beam combiner 206 receives light signals 208 and 210 and adjusts their intensity based on input signals from video ASIC 110.

Beam combiner 206 is a planar lightwave circuit, monolithically integrated on substrate 212, which receives a plurality of light signals having a plurality of wavelengths and polarization modes and combines these light signals into a composite output signal. Beam combiner 206 comprises input ports 214-1 through 214-8, waveguides 216-1 through 216-8, power controllers 218-1 through 218-8, mixing region 220, and output port 224.

Beam combiner 206 receives light signals 208 and 210 at input ports 214-1 through 214-8 (referred to, collectively, as input ports 214), combines the light signals into composite output signal 222 in mixing region 220, and provides composite output signal 222 at output port 224.

It is an aspect of the present invention that beam combiners in accordance with the present invention are capable of combining many more wavelengths than are practical using beam combiners known in the prior art. Further, beam combiners in accordance with the present invention are capable of combining light signals having disparate and irregularly spaced wavelengths. One skilled in the art will recognize that prior-art beam combiners, such as free-space beam combiner 118, fusion-spliced fiber couplers, and the like, are not well suited to combining more than three light signals. Further, other prior-art beam combiners, such as array-waveguide gratings, are not well suited to combining light signals having disparate and/or irregularly spaced wavelengths.

Substrate 212 is a conventional substrate suitable for supporting the formation of beam combiner 206. Typical materials used for substrate 212 include, without limitation, silicon, glass, quartz, III-V semiconductors, II-VI semiconductors, ceramics, and the like.

Light sources 202 and 204 are mounted directly on substrate 212 and optically coupled directly with input ports 214. As depicted in FIG. 2, beam combiner 206 can receive light signals 208 in any input pattern. It should be noted, however, that each input port is designed to enable it to optically couple its corresponding light signal with low loss, based on the optical mode of that light signal, its wavelength, and its polarization mode. For example, input port 214-1 is designed to receive light signal 208-1, input port 214-4 is designed to receive light signal 210-1, input port 214-7 is designed to receive light signal 208-4, and so on.

In some embodiments, each of input ports 214 includes a mode-matching region having an input facet whose optical mode substantially matches the output mode of its respective light source. Each mode-matching region has a cross-section whose size is gently tapered so that its optical mode adiabatically transitions to the optical mode of the surface waveguide 216 to which it is optically coupled. As a result, the mode matching regions optically couple light sources 202 and 204 to waveguides 216-1 through 216-8 (referred to, collectively, as waveguides 216) with low loss. Input ports 214 are in accordance with input ports described in detail in the parent application, U.S. patent application Ser. No. 13/208,806. Input ports having mode-matching capability enable the hybrid integration of light sources 202 and 204 with beam combiner 206 to collectively define a "light engine" that can be smaller, cheaper, and more robust than photonics modules found in the prior art.

Each of waveguides 216 is based on a high-contrast surface waveguide structure having a core that comprises silicon nitride. Waveguides 216 are in accordance with high-contrast waveguide structures described in detail in U.S. patent application Ser. No. 13/208,806. As discussed in the parent application, the use of such waveguides affords embodiments of the present invention several advantages. One skilled in the art will recognize, after reading this Specification, that other waveguide technologies can be used to form waveguides 216, such as, without limitation, silica waveguides, silicon oxynitride waveguides, tantalum oxide waveguides, lithium niobate waveguides, and the like.

First, such waveguides are characterized by strong optical mode confinement. As a result, they can include curved sections that have small bend radii and can be routed in densely packed arrangements. Planar lightwave circuits based on waveguide 216, therefore, can provide a high degree of functionality in a much smaller footprint than conventional low-index waveguide-based planar lightwave circuits.

Second, waveguide structures in accordance with the present invention do not require dopant diffusion to achieve their guiding capability. The use of undoped materials, such as stoichiometric silicon nitride and stoichiometric silicon dioxide, enables higher power handling than waveguides that are doped to control refractive index of one or more of their core and cladding. Further, the use of undoped materials also enables low-loss propagation of light having shorter wavelengths than is possible with conventional doped waveguide structures.

Third, waveguides such as waveguides 216 enable beam combiners that can operate over an extremely broad wavelength range (e.g., within the range of approximately 400 nm to approximately 2000 nm).

Each of input ports 214 is coupled with its respective waveguide 216 via one of power controllers 218-1 through 218-8 (referred to, collectively, as power controllers 218). Like input ports 214, each of power controllers 218 is specifically designed to operate on its corresponding light signal. Power controllers 218 control the intensity of each of light signals 208 and 210, based on control signals from video ASIC 110, to control the color of output signal 230 at each pixel in display region 108. In some embodiments, power controllers 218 are not included in beam combiner 220 and the ratio of light signals 208 and 210 in output signal 226 is controlled by directly modulating the drive currents to light sources 202 and 204.

FIG. 4 depicts a schematic drawing of a power controller in accordance with the illustrative embodiment of the present invention. Power controller 218-$i$ comprises attenuator 402-$i$ and power monitor 404-$i$. In response to control signals from video ASIC 110 and the output of power monitor 404-$i$, power controller 218-$i$ diverts optical power (via attenuator 402-$i$) from waveguide 216-$i$ to a light dump in order to control the amount of optical power of light signal 208-$i$ (or, alternatively, 210-$i$) that reaches mixing region 220.

Attenuator 402-$i$ comprises waveguide 216-$i$ and waveguide 408-$i$, which are arranged to define directional couplers 408-1 and 408-2.

Directional couplers 408-1 and 408-2 are substantially identical directional couplers arranged in series and interposed by waveguide portions 410-$i$ and 412-$i$. Waveguide portion 410-$i$ is a first portion of waveguide 216-$i$. Waveguide portion 412-$i$ is optically coupled with light dump 416-$i$. It will be clear to one skilled in the art how to specify, make, and use light dump 416-$i$.

Modulator 414-$i$ comprises a heater strip for thermally inducing a phase shift in the light that propagates through waveguide portion 410-$i$. This phase shift determines the amount of optical coupling occurs between waveguide portions 410-$i$ and 412-$i$. This optical coupling, in turn, dictates how much of the optical power of light signal 208-$i$ is diverted into waveguide portion 412-$i$ and lost at light dump 416-$i$. The remainder of light signal 208-$i$ continues propagating in waveguide 216-$i$ to output 424-$i$, which is optically coupled with mixing region 220.

Although the illustrative embodiment comprises modulators that operate on a thermo-optic effect, it will be clear to one skilled in the art, after reading this Specification, how to specify, make, and use alternative embodiments of the present invention that comprise modulators that induce a phase shift in light propagating in a waveguide based on a different effect, such as electro-optic, opto-mechanical, etc.

Power monitor 404-$i$ comprises waveguide 216-$i$, waveguide 418-$i$, and photodetector 422-$i$. Waveguide 216-$i$ and waveguide 418-$i$ are arranged to define directional coupler 420-$i$.

Directional coupler 420-$i$ enables a small percentage of its optical power to be coupled from waveguide 216-$i$ into waveguide portion 418-$i$.

Waveguide portion 418-*i* is optically coupled with conventional photodetector 422-*i* (e.g., photodiode, avalanche photodiode, CCD sensor element, etc.), which is electrically coupled with processor 104 to provide the processor with a feedback signal suitable for controlling attenuator 402-*i*.

It is an aspect of the present invention that the use of power controllers 218-1 through 218-8 obviates the need to vary the drive current to each of light sources 202 and 204 to control the color of output 230. As a result, embodiments of the present invention can avoid undesirable optical effects in the composite output signal, such as wavelength chirping, accelerated degradation, mode hopping, and the like. The use of power controllers 218 also enables the use of laser sources, such as frequency-doubled lasers or diode-pumped solid-state lasers, without a need for their customary external modulators. Further, since the attenuators are easily integrated in the PLC design, their inclusion adds little or no additional size to the overall system.

Power controllers 218 pass their respective light signals, at their specified intensities, to mixing region 220, wherein light signals 208 and 210 are combined to form composite output signal 222.

At operation 303, light signals 208 and 210 are combined in mixing region 220.

Figure 5:
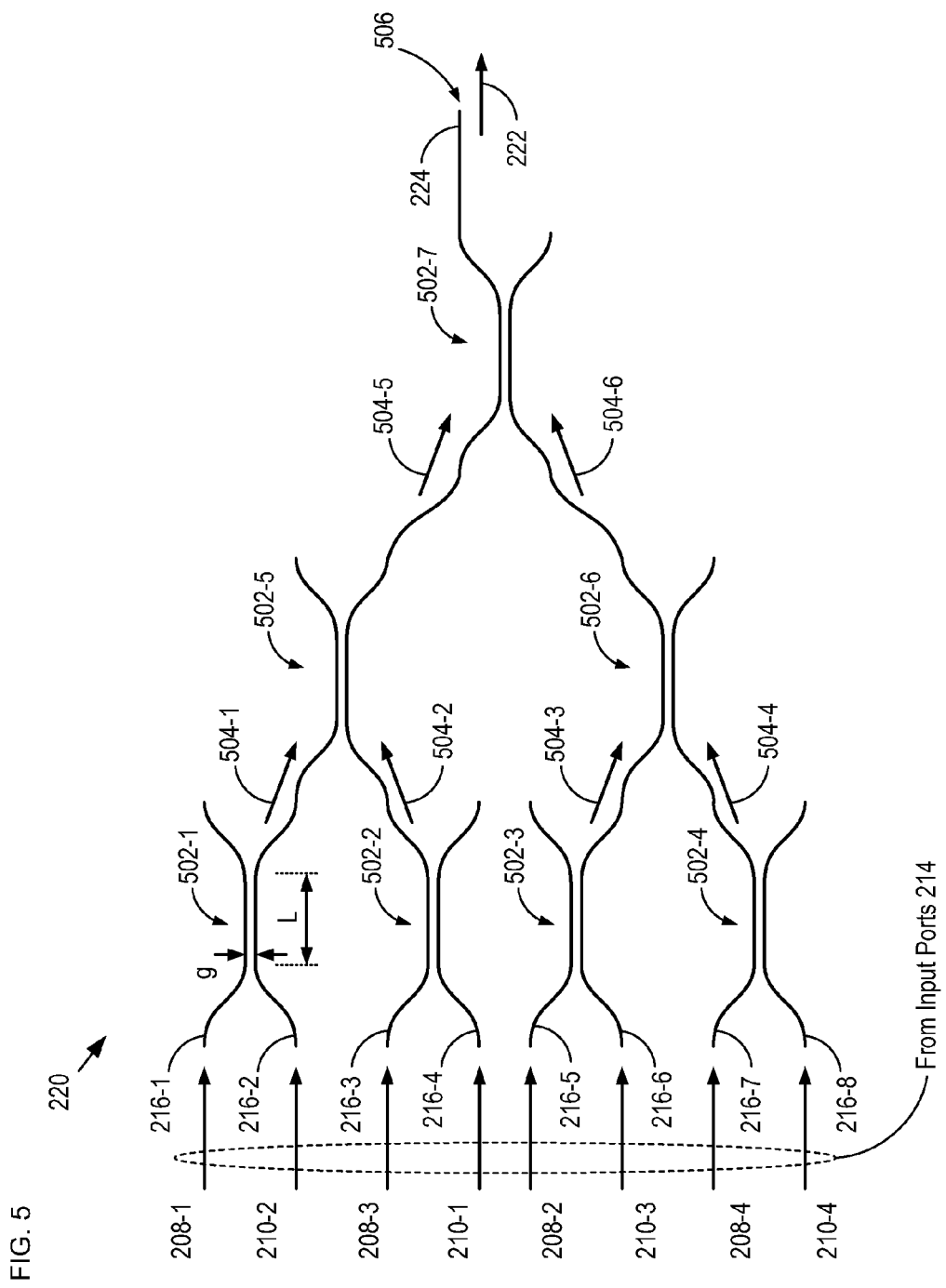
FIG. 5 depicts a schematic drawing of a mixing region in accordance with the illustrative embodiment of the present invention.

FIG. 5 depicts a schematic drawing of a mixing region in accordance with the illustrative embodiment of the present invention. Mixing region 220 comprises waveguides 216-1 through 216-8, which are arranged to collectively define directional couplers 502-1 through 502-7 and output port 224.

Each of directional couplers 502-1 through 502-7 (referred to, collectively, as directional couplers 502) is a symmetric coupler (i.e., the portions of the first and second waveguides that define the directional coupler along coupling length, L, have substantially the same width) that is characterized by wavelength-dependent power coupling that varies slowly with wavelength. One skilled in the art will recognize that each directional coupler 502 is designed for operation at the specific wavelengths it conveys and couples. The spacing, g, between the first and second waveguides along coupling length, L, the characteristics of the waveguides themselves, and the length, L, of the coupling region, determine the coupling characteristics of the directional coupler. These parameters are carefully chosen to enable substantially all of the optical energy of a first light signal in the first waveguide to optically couple from that waveguide into the second waveguide along coupling length L, but substantially none of the optical energy of a second light signal in the second waveguide to optically couple from that waveguide into the first waveguide. As a result, the directional coupler provides both light signals, combined as a composite output signal, on the second waveguide. Details of directional couplers in accordance with the present invention are disclosed in U.S. patent application Ser. No. 13/208,806.

In the illustrative embodiment, light signals 208 and 210 are combined to form composite output signal 222.

Figure 6:
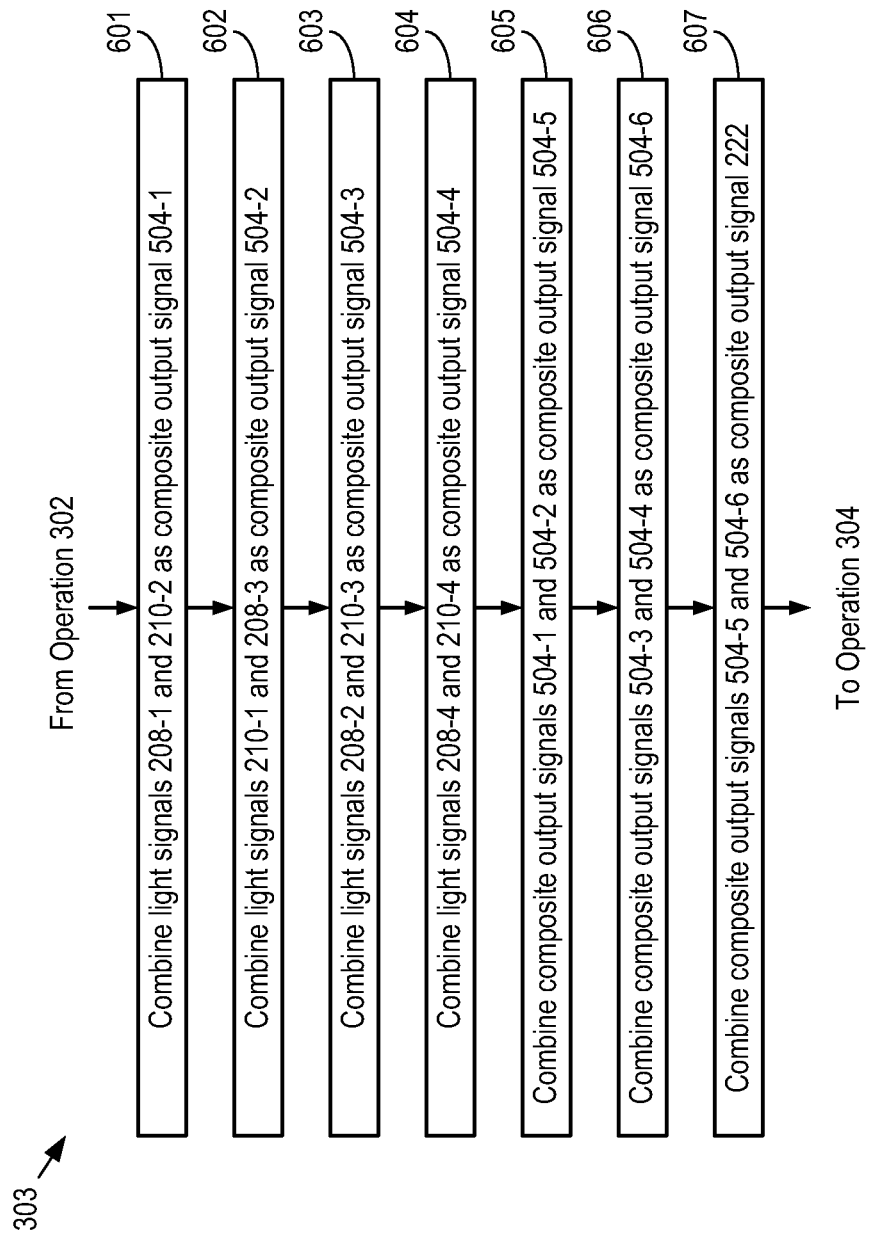
FIG. 6 depicts sub-operations suitable for use in operation 303 in accordance with the illustrative embodiment of the present invention.

FIG. 6 depicts sub-operations suitable for use in operation 303 in accordance with the illustrative embodiment of the present invention. Operation 303 begins with sub-operation 601, wherein, at directional coupler 502-1, all of the optical energy of light signal 208-1 is coupled from waveguide 216-1 into waveguide 216-2, while all of the optical energy of light signal 210-2 remains in waveguide 216-2. The combined light signals are then provided to directional coupler 502-5 as composite output signal 504-1.

At sub-operation 602, at directional coupler 502-2, all of the optical energy of light signal 210-1 is coupled from waveguide 216-4 into waveguide 216-3, while all of the optical energy of light signal 208-3 remains in waveguide 216-3. The combined light signals are then provided to directional coupler 502-5 as composite output signal 504-2.

At sub-operation 603, at directional coupler 502-3, all of the optical energy of light signal 208-2 is coupled from waveguide 216-5 into waveguide 216-6, while all of the optical energy of light signal 210-3 remains in waveguide 216-6. The combined light signals are then provided to directional coupler 502-6 as composite output signal 504-3.

At sub-operation 604, at directional coupler 502-4, all of the optical energy of light signal 210-4 is coupled from waveguide 216-8 into waveguide 216-7, while all of the optical energy of light signal 208-4 remains in waveguide 216-7. The combined light signals are then provided to directional coupler 502-6 as composite output signal 504-4.

At sub-operation 605, at directional coupler 502-5, all of the optical energy of composite output signal 504-1 is coupled from waveguide 216-2 into waveguide 216-3, while all of the optical energy of composite output signal 504-2 remains in waveguide 216-3. The combined signals are then provided to directional coupler 502-7 as composite output signal 504-5.

At sub-operation 606, at directional coupler 502-6, all of the optical energy of composite output signal 504-4 is coupled from waveguide 216-7 into waveguide 216-6, while all of the optical energy of composite output signal 504-3 remains in waveguide 216-6. The combined signals are then provided to directional coupler 502-7 as composite output signal 504-6.

At sub-operation 607, at directional coupler 502-7, all of the optical energy of composite output signal 504-6 is coupled from waveguide 216-6 into waveguide 216-3, while all of the optical energy of composite output signal 504-5 remains in waveguide 216-3. The combined signals are then provided to output port 224 as composite output signal 222. Output port 224 is the end portion of waveguide 216-3 that includes output facet 506.

Returning now to FIGS. 2 and 3, at operation 304, output 230 is generated. In order to generate output 230, composite output signal 222 is first launched into free-space at output port 224 as output signal 226.

Output signal 226 is captured and collimated by optics 228 to generate output 230 as a substantially collimated light beam. Optics 228 is typically a collimating refractive lens; however, in some embodiments, optics 228 comprises a different optical element, such as a diffractive lens, cylindrical lens, and the like. In some embodiments, optics 228 is disposed directly on substrate 212 and output signal 226 is not launched into free-space prior to its being converted into output 230. In some embodiments, output port 224 comprises a mode-matching region for matching the output mode of output port 224 to the input mode (e.g., aperture) of optics 228.

In some embodiments, optics 228 includes a polarization converter (e.g., a quarter-wave plate) that converts linearly polarized light to circularly polarized light. With linearly polarized 3D images, the illusion of three-dimensionality is lost when a user tilts his or head. Images projected using circularly polarized light, however, enable the viewer to tilt his or her head without losing the 3D effect.

At operation 305, scanner 124 scans output 230 over display region 108 at video rates to form image 232. It should be noted that, in contrast to images 106-1 and 106-2, image 232 is a single image that contains image data in each polarization state. As a result, projector 200 requires no complicated optical alignment and/or calibration to ensure image alignment.

Further, since image 232 is a collimated laser beam, it is always in focus—even when projected on a non-flat surface.

Although the illustrative embodiment comprises a projector that provides images that are linearly polarized, it will be clear to one skilled in the art, after reading this specification, how to specify, make, and use alternative embodiments of the present invention that operate with light having other polarization modes, such as circularly polarized light signals.

FIG. 7 depicts a schematic drawing of a light engine in accordance with a first alternative embodiment of the present invention. Light engine 700 comprises light sources 202 and 204 and beam combiner 702.

Beam combiner 702 comprises input ports 720, waveguides 216, power controllers 722, mixing regions 704-1 and 704-2, and output port 710. Beam combiner 702 is analogous to beam combiner 206; however, beam combiner 702 includes two distinct mixing regions that separately combine the light signals of the different polarizations.

Input ports 720 and power controllers 722 are analogous to input ports 214 and power controllers 218, respectively. As described above, and with respect to FIG. 2, the input ports and power controllers are specifically designed for their corresponding light signals, based on the optical mode, wavelength, and polarization of each light signal.

Mixing region 704-1 comprises three directional couplers arranged in a tree structure, in analogous fashion to mixing region 220 described above, to combine TE-polarized light signals 208-1 through 208-4 into TE-polarized composite output signal 706-1 on waveguide 216-9. In similar fashion, mixing region 704-2 comprises three directional couplers arranged in a tree structure to combine TM-polarized light signals 210-1 through 210-4 into TM-polarized composite output signal 706-2 on waveguide 216-10.

Waveguide 216-9 conveys composite output signal 706-1 to output port 708-1. Waveguide 216-10 conveys composite output signal 706-2 to output port 708-2. Output ports 708-1 and 708-2 collectively define output port 710, which is analogous to output port 224.

At output port 710, each of composite output signals 706-1 and 706-2 is launched into free-space as output signals 712-1 and 712-2, which collectively define output signal 714, which is analogous to output signal 226.

Output signals 712-1 and 712-2 are substantially collimated at optics 228-1 and 228-2 to provide output beams 716-1 and 716-2, which collectively define output 718, which is analogous to output 230.

In similar fashion to the operation of projector 200, described above and with respect to FIGS. 2-6, scanner 124 receives output 718 and scans it over display region 108. In contrast to projector 200, however, a projector comprising beam combiner 700 generates two separately polarized images on display region 108. To mitigate image blur, ghosting, and other undesirable optical effects, output ports 708-1 and 708-2 are formed such that they are separated by distance, d, wherein d is preferably within the range of approximately 5 microns to approximately 200 microns, and more preferably within the range of approximately 7 microns to approximately 20 microns. It should be noted, however, that separation distance, d, is a function of the scan rate of scanner 124, the design of optics 228, and the anticipated separation distance between optics 228 and display region 108.

Unfortunately, by locating output ports 708-1 and 708-2 in close proximity, optical cross talk between waveguides 216-9 and 216-10 can become possible. As a result, in some embodiments, the refractive-index contrast of waveguides 216-9 and 216-10 (and/or output ports 708-1 and 708-2) is locally increased (by, for example, tapering the cross-sections of the waveguides) so that the optical modes of composite output signals 706-1 and 706-2 is more tightly confined within the waveguides.

FIG. 8 depicts a schematic drawing of an output port in accordance with a second alternative embodiment of the present invention. Output port 800 comprises waveguides 216-9 and 216-10, output ports 708-1 and 708-2, and trench 802.

Trench 802 is a narrow trench, typically having a width of 3 microns or less and a depth of approximately 10 microns. Trench 802 is formed between output ports 708-1 and 708-2 to further increase the optical mode confinement in waveguides 216-9 and 216-10, thereby decreasing the risk of optical cross talk between the waveguides.

Returning now to FIG. 7, in some embodiments, the separation between output ports 708-1 and 708-2 is larger than 10 microns to mitigate cross talk between the waveguides. In such embodiments, however, there is typically a discernable distance between the projected images formed by scanned output beams 716-1 and 716-2 due to the relative position of the different output beams on scanner 124, the timing of the projection of each polarized output signal, and the scan rate of scanner 124. As a result, undesirable optical effects, such as smearing, ghosting, etc., impair the perceived 3D image. In fact, these undesirable optical effects can arise in any of the embodiments of the present invention wherein the output comprises more than one output beam, such as output 718, but are particularly prominent for embodiments wherein output ports are separated by large distances (e.g., >100 microns).

As a result, in some embodiments having an output that includes more than one output beam, method 300 continues with optional operation 306, wherein the timing of the control signals that control the intensities of each of light signals 208 and 210 is adjusted to effect a delay or advance in one polarization output signal to improve the overlap of the two polarized signals directed at each pixel in the display region. The timing is adjusted based on the scan rate of scanner 124 to substantially co-locate the two polarized images on display region 108. For example, if the scan rate of scanner 124 results in output 716-2 "trailing" output 716-1 across display region 108 by 10 microseconds, the data signals used to control the intensities of light signals 208 can be adjusted by 10 microseconds to correct this displacement. It should be noted that the trailing time between the polarized images depends primarily on the scan rate of scanner 124 and separation distance, d (i.e., it is independent of the distance between the projector and display region 108). It should be noted that optional operation 306 enables separation distance, d, to be of any practical size—even up to several hundreds of microns.

Figure 9:
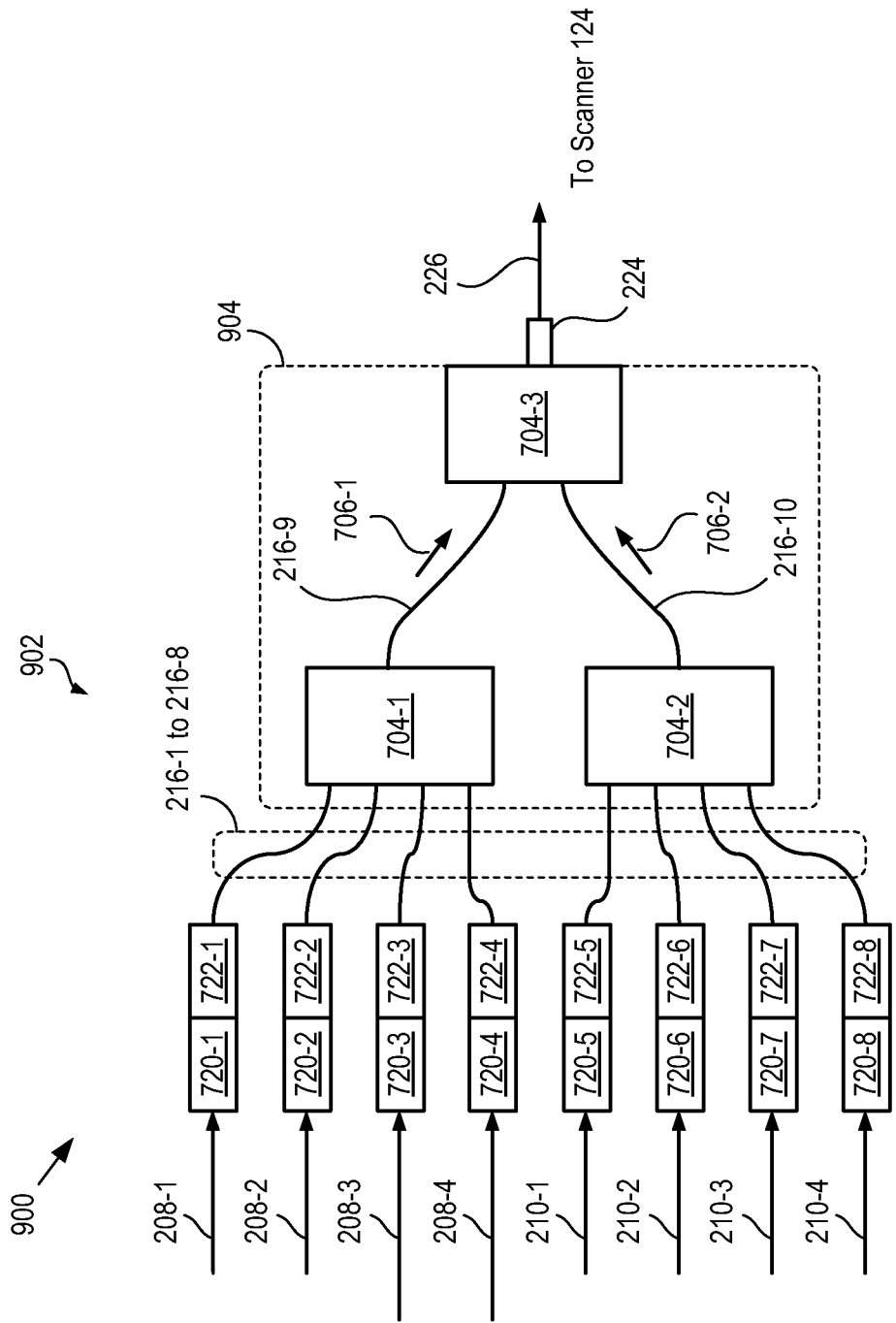
FIG. 9 depicts a schematic drawing of a light engine in accordance with a third alternative embodiment of the present invention.

FIG. 9 depicts a schematic drawing of a light engine in accordance with a third alternative embodiment of the present invention. Light engine 900 comprises light sources 202 and 204 and beam combiner 902.

Beam combiner 902 comprises input ports 720, waveguides 216, power controllers 722, mixing region 904, and output port 224. Beam combiner 902 is analogous to beam combiner 702; however, beam combiner 902 includes a third mixing region that combines the oppositely polarized output signals of mixing regions 704-1 and 704-2 into a composite output signal that includes both polarizations.

Mixing region 704-3 comprises a directional coupler that is dimensioned and arranged to combine TE-polarized composite output signal 706-1 and TM-polarized composite output signal 706-2 into composite output signal 222 at output port 224.

In some embodiments, input ports 720, waveguides 216, power controllers 722, mixing regions 704-1, 704-2, and 704-3, and output port 710 are monolithically integrated. In some embodiments, at least one of mixing regions 704-1, 704-2, and 704-3 is formed on a separate substrate and optically coupled with the other mixing regions via optical fibers or through free-space. In some of these embodiments, light sources 202 are mounted on the same substrate that comprises mixing region 704-1 and light sources 204 are mounted on the same substrate that comprises mixing region 704-2.

FIG. 10 depicts a schematic drawing of an input stage of a light engine in accordance with a fourth alternative embodiment of the present invention. Input stage 1000 comprises light sources 202-1 through 202-4, input ports 720-1 through 720-4, power controllers 722, switches 1002-1 through 1002-4, and polarization rotators 1008. Although input stage 1000 is depicted as being operatively coupled with light engine 900, it will be clear to one skilled in the art, after reading this specification, that input stage 1000 is suitable for use with any embodiment of the present invention.

Switches 1002-1 through 1002-4 (referred to, collectively, as switches 1002) are active PLC-based switches that enable the optical power of an input light signal to be switched to either of their respective outputs 1004 and 1006. Switches 1002 control to which output their respective light signals are directed based on control signals from either of processor 104 or video ASIC 110 (not shown for clarity). For example, switch 1002-3 is dimensioned and arranged to receive light signal 208-3 from input port 720-3 and switch the light signal to one of outputs 1004-3 and 1006-3. PLC-based switches suitable for use with the present invention are disclosed in U.S. patent application Ser. No. 13/208,806. In some embodiments at least one of switches 1002 comprises a different optical element, such as an asymmetric y-junction switch, a microring resonator, a Mach-Zehnder interferometer-based switch, etc.

Polarization rotators 1008 are conventional elements that enable the polarization mode of a light signal to be switched to its opposite sense (e.g., between TE and TM or between right-circular and left-circular, etc.). In some embodiments, polarization rotators 1008 are half-wave plates inserted into slots formed at right angles (or slightly displaced from right angles to reduce back-reflection) to waveguides 216-5 through 216-8. One skilled in the art will recognize that there are many ways to effect a polarization rotator suitable for use with embodiments of the present invention, such as those disclosed in: "Surface Plasmon induced polarization rotation and optical vorticity in a single mode waveguide," *Optics Express*, Vol. 15, No. 15, Jul. 23, 2007, pp. 9476-9485; "Integrated polarization rotator made of periodic asymmetric buried $Ta_2O_5$/silica sol-gel waveguides," *Optics Express, Vol.* 15, No. 19, Sep. 17, 2007, pp. 12436-12442; and "Polarization rotation in asymmetric periodic loaded rib waveguides," *Applied Physics Letters*, Vol. 59, No. 11, Sep. 9, 1991, pp. 1278-1280, each of which is incorporated herein by reference.

In operation, switches 1002 direct all of the optical power in light signals 208-1 through 208-4 to power controllers 722-1, 722-2, 722-3, and 722-4 during the first half of a timeslot allocated for illumination of an image pixel. The power controllers control the intensity of each of the light signals in response to control signals from one of processor 104 or video ASIC 110 (not shown for clarity). The light signals are then combined in mixing region 704-1, passed through by mixing region 704-3, and projected to illuminate the image pixel with a full color, TE-polarized light beam. During the second half of the timeslot, switches 1002 direct all of light signals 208-1 through 208-4 to power controllers 722-5, 722-6, 722-7, and 722-8, which control the intensity of the light signals in response to control signals from one of processor 104 or video ASIC 110. These light signals are then combined in mixing region 704-2, passed through by mixing region 704-3, and projected to illuminate the image pixel with a full color, TM-polarized light beam.

The inclusion of switches 1002 and polarization rotators 1008 enable the projection of dual images having different polarizations with only one set of light sources. Laser cost is a significant factor in the overall system cost for a 3D projector. By eliminating the need for half of the light sources, therefore, system cost is dramatically reduced. In some embodiments, the control signals provided to the power controllers are delayed for one polarization due to the scan-rate induced optical effects discussed above.

In some embodiments, switches 1002 are replaced by passive 3 dB splitters that distribute the optical power in light signals 208-1 through 208-4 to their respective pairs of power controllers 722. Although this reduces the intensity of each of the projected polarized images by approximately half, it enables the two polarized images to be projected at the same time.

FIG. 11 depicts a schematic drawing of an output port in accordance with a fifth alternative embodiment of the present invention. Output port 1100 comprises waveguides 216-9 and 216-10, output ports 706-1 and 706-2, and polarization rotator 1102.

Polarization rotator 1102 is a substantially achromatic conventional polarization rotator, such as a half-wave plate, suitable for operation with all of light signals 208.

By including polarization rotator 1102 in output port 1100, polarization rotators 1008 in input stage 1000 described above and with respect to FIG. 10 are obviated. Further, locating the polarization rotator after mixing region 904 enables the use of identical layouts for mixing regions 704-1 and 704-2. Still further, it relieves some of the design complexity for mixing region 704-3, since this mixing region must only combine light signals of a single polarization.

Figure 12:
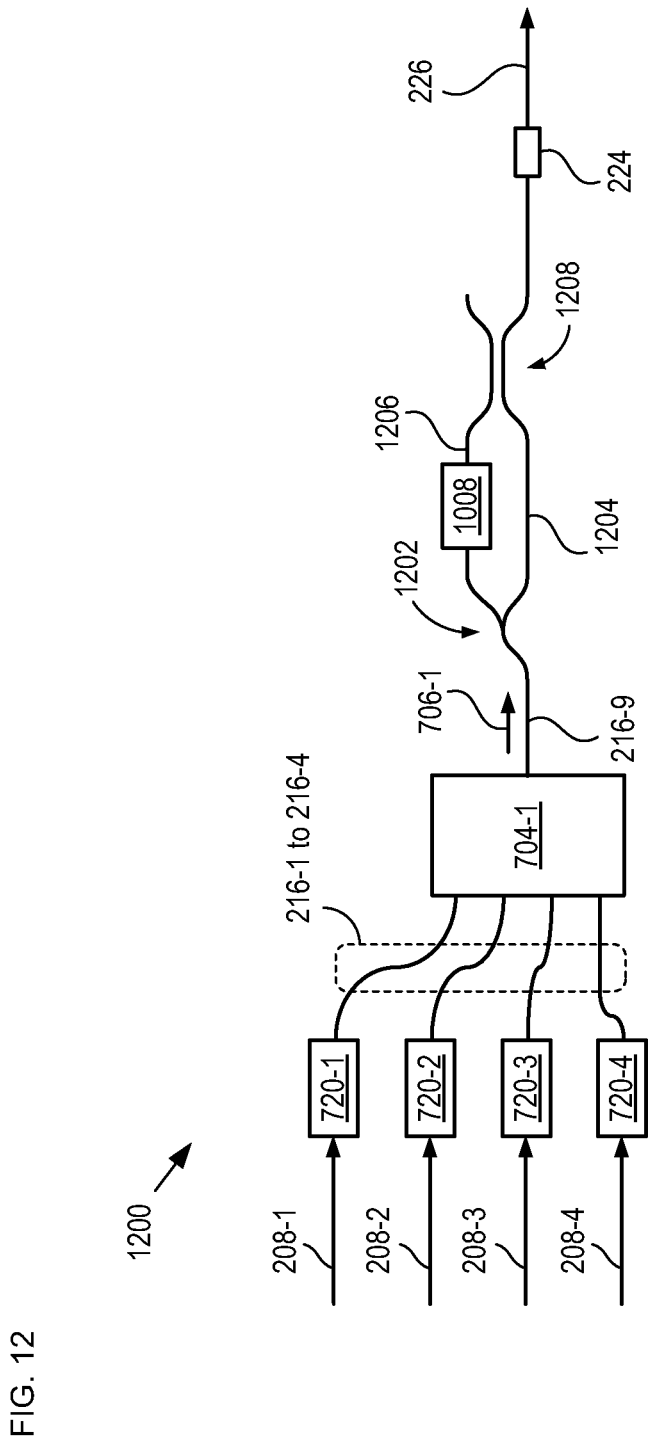
FIG. 12 depicts a schematic drawing of a beam combiner in accordance with a sixth alternative embodiment of the present invention.

FIG. 12 depicts a schematic drawing of a beam combiner in accordance with a sixth alternative embodiment of the present invention. Beam combiner 1200 comprises input ports 720-1 through 720-4, mixing region 704-1, distributor 1202, polarization rotator 1008, directional coupler 1208, and output port 224.

As described above and with respect to FIG. 7, light signals 208-1 through 208-4 are received at input ports 720-1 through 720-4 and combined in mixing region 704-1 to form composite output signal 706-1. Composite output signal 706-1 is a TE-polarized multicolor light signal.

Distributor 1202 comprises an achromatic switch, such as an asymmetric γ-junction switch, a cascaded Mach-Zehnder Interferometer-based switch, and the like. At distributor 1202, composite output signal 706-1 is alternately switched between waveguide portions 1204 and 1206 during the first and second halves of a timeslot allocated for illumination of each image pixel in display region 108. While propagating through waveguide portion 1206, the polarization mode of composite output signal 706-1 is rotated from TE to TM at polarization rotator 1008.

Directional coupler 1208 comprises an achromatic directional coupler that is dimensioned and arranged to couple all of the light in TM-polarized composite output signal 706-1 back into waveguide 216-9 while keeping all of the light in TE-polarized composite output signal 706-1 in waveguide 216-9. As a result during each time slot, output signal contains both polarizations of the light signal intended to illuminate its corresponding image pixel.

By virtue of distributor 1202, polarization rotator 1206, and directional coupler 1208, beam combiner 1200 enables projection of two oppositely polarized images to be displayed in display region 108 with only half the number of light sources required for projector 200 and light engine 700 and only a single polarization rotator, as compared to the eight required for input stage 1000 as shown in FIG. 10. In addition, the use of a single polarization rotator located after a mixing region obviates waveguide crossovers, which are inherently required in input stages such as input stage 1000.

In some embodiments, beam combiner 1200 receives TM-polarized light signals and polarization rotator 1206 rotates the polarization from TM to TE. In some embodiments, directional coupler 1208 is not included and waveguides 1204 and 1206 collectively define output port 224, such as is discussed above and with respect to FIG. 7.

It should noted that beam combiner 1200 does not include power controllers to control the intensity of light signals 208 in output 226. As a result, the intensity of each of light signals 208 is controlled via direct modulation. In some embodiments, however, power controllers are used, as discussed above. In embodiments of the present invention wherein direct modulation is used to control the intensities of light signals 208 and/or 210, power monitors, such as power monitor 404 are included to provide a feedback signal for the light signal intensity.

Figure 13:
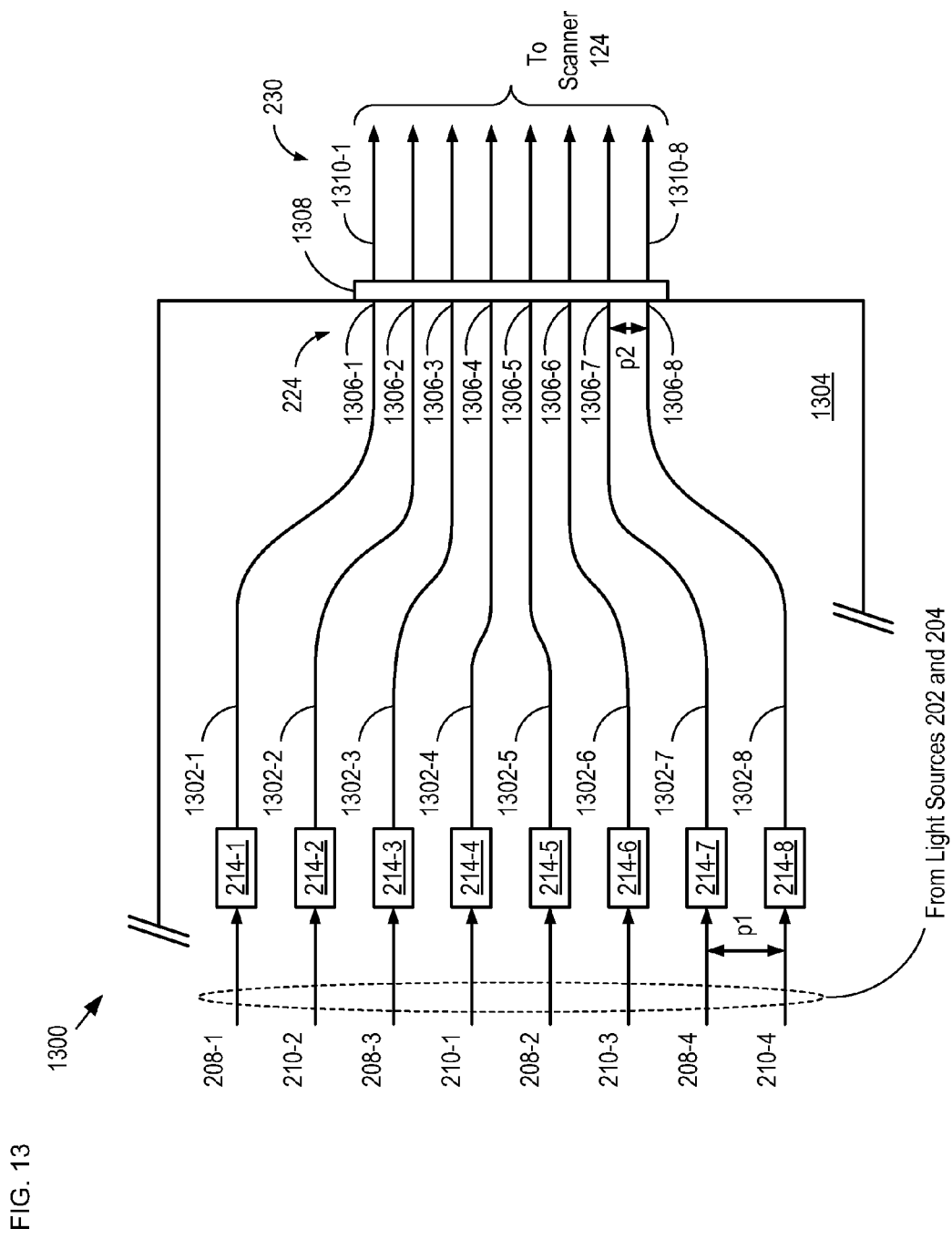
FIG. 13 depicts a schematic drawing of a beam combiner in accordance with a seventh alternative embodiment of the present invention.

FIG. 13 depicts a schematic drawing of a beam combiner in accordance with a seventh alternative embodiment of the present invention. Beam combiner 1300 comprises waveguides 1302-1 through 1302-8, which are formed on substrate 1304 to collectively define a planar lightwave circuit. Beam combiner receives light signals 208 from light sources 202 and 204 at input ports 720. In some embodiments, beam combiner 1300 comprises power controllers 722.

Light sources 202 and 204 are arranged in a linear array having pitch, p1. The size of p1 is determined by the minimum spacing on which the light sources can be located without introducing optical and/or electrical cross talk, parasitic electrical effects, thermal management issues, and handling problems. In some embodiments, light sources 202 and 204 are provided as a monolithically integrated laser diode array having pitch p1.

Input ports 720 are arranged in a linear array having a pitch, p1, which substantially matches the pitch of light sources 202 and 204.

Waveguides 1302-1 through 1302-8 (referred to, collectively, as waveguides 1302) are analogous to waveguides 216. Waveguides 1302 convey each of light signals 208 and 210 from input ports 720 to output facets 1306-1 through 1306-8 (referred to, collectively, as output facets 1306). Output facets 1306 collectively define output port 224. At output port 224, output facets 1306 are arranged in a linear array having a pitch, p2, which is typically within the range from approximately 5 microns to approximately 15 microns, and typically less than or equal to 10 microns.

Output port 224 is optically coupled with lenslet array 1308, which comprises a plurality of lenses for collimating light signals 208 and 210 and providing them as substantially parallel, individual light beams 1310-1 through 1310-8. Light beams 1310-1 through 1310-8 collectively define output 230. In some embodiments light signals 208 and 210 are collimated using a single lens.

Because the run-out distance between output facet 1308-1 and 1308-8 is as large as 70-80 microns, when output 230 is scanned over displayer region 108, the resultant 3D image is susceptible to the same optical problems discussed above and with respect to FIG. 7, such as aliasing, ghosting, smearing, etc. As a result, optional operation 306 of method 300 is suitable for use with this embodiment of the invention as well. As a result of operation 306, the sequence and timing of the data signals that control the intensity of each light signal is controlled to mitigate these optical effects and substantially co-locate the two polarized images on display region 108. For example, if the scan rate of scanner 134 results in each output beam 1310 "trailing" its predecessor across display region 108 by 10 microseconds, the data signals used to control the intensities of light signals 208 and 210 are adjusted by 10 microseconds to correct this displacement.

It is a further aspect of the present invention that by appropriately controlling the sequencing and timing of the data signals used to control light signals 208 and 210, beam combiner 1300 can be eliminated all together, as long as scanner 134 is large enough and fast enough to accommodate the separation of light signals 208 and 210 as they are provided by sources 202 and 204 and still produce an image at suitable video rates.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A projector comprising:
   a beam combiner comprising a plurality of waveguides that are monolithically integrated, the plurality of waveguides being arranged to define;
   a first plurality of input ports that receive a first plurality of light signals having a first polarization;
   a second plurality of input ports that receive a second plurality of light signals that have a second polarization;
   a first mixing region; and
   an output port, the output port providing an output signal comprising the first plurality of light signals and the second plurality of light signals.

2. The projector of claim 1 further comprising a scanner that receives the output signal and scans it over a display region.

3. The projector of claim 1 further comprising a first plurality of light sources and a second plurality of light sources, the first plurality of light sources providing the first plurality of light signals and the second plurality of light sources providing the second plurality of light signals.

4. The projector of claim 1 further comprising:
   a plurality of light sources that provide a third plurality of light signals having the first polarization;
   a plurality of splitters that distribute each of the third plurality of light signals into one of the first plurality of light signals and one of a fourth plurality of light signals; and
   a first plurality of converters, wherein each of the first plurality of converters receives one of the fourth plurality of light signals, converts it from the first polarization to the second polarization, and provides it as one of the second plurality of light signals.

5. The projector of claim 1 wherein the output signal comprises (1) a first composite light signal that includes the first plurality of light signals and (2) a second composite light signal that comprises the second plurality of light signals.

6. The projector of claim 5 wherein the output port comprises a first output waveguide and a second output waveguide, the first output waveguide conveying the first composite light signal and the second output waveguide conveying the second composite light signal.

7. The projector of claim 6 wherein the first mixing region comprises a first waveguide portion that has a first refractive-index contrast, and wherein the first output waveguide comprises a second waveguide portion that is characterized by a second refractive-index contrast that is higher than the first refractive-index contrast.

8. The projector of claim 6 wherein the beam combiner further comprises a trench that interposes the first output waveguide and the second output waveguide.

9. The projector of claim 1 wherein the output signal comprises a first composite light signal that includes the first plurality of light signals and the second plurality of light signals.

10. The projector of claim 1 wherein the first mixing region comprises (1) a second mixing region that includes the first plurality of input ports and (2) a third mixing region that includes the second plurality of input ports, wherein the second mixing region is dimensioned and arranged to combine the first plurality of light signals into a first composite output signal and the third mixing region is dimensioned and arranged to combine the second plurality of light signals into a second composite output signal.

11. The projector of claim 10 wherein the first mixing region comprises a fourth mixing region that is dimensioned and arranged to combine the first composite output signal and the second composite output signal into a third composite output signal, and wherein the output signals is based on the third composite output signal.

12. The projector of claim 1 wherein the first mixing region comprises a second mixing region that includes the first plurality of input ports and the second plurality of input ports, and wherein the second mixing region is dimensioned and arranged to combine the first plurality of light signals and the second plurality of light signals into a first composite output signal, and further wherein the output signals is based on the first composite output signal.

13. The projector of claim 1 wherein the beam combiner further comprising an attenuator, the attenuator being dimensioned and arranged to control the amount of optical energy of one of the first plurality of light signals in the output signal, wherein the plurality of waveguides are further arranged to define the attenuator.

14. The projector of claim 1 further comprising a first light source that provides one of the first plurality of light signals, wherein the first light source is characterized by an output optical mode, and wherein a first input port of the first plurality of input ports comprises a mode-matching region that includes a facet having an optical mode that is substantially matched to the output optical mode.

15. A projector comprising:
a planar lightwave circuit that includes a plurality of waveguides, the planar lightwave circuit comprising;
    a plurality of input ports, the plurality of input ports receiving (1) a first plurality of light signals that are polarized with a first polarization and (2) a second plurality of light signals that are polarized with a second polarization; and
    a plurality of output ports that collectively provide an output signal, the plurality of ports comprising a plurality of facets that are arranged along a line, the output signal comprising the first plurality of light signals and the second plurality of light signals.

16. The projector of claim 15 further comprising a scanner that receives the output signal and scans it over a displayer region.

17. The projector of claim 15 wherein the plurality of output ports collectively define a plurality of output facets that are arranged along a line, and wherein the spacing between the plurality of output facets is less than or equal to ten microns.

18. The projector of claim 17 wherein each of the output ports comprises a waveguide portion having a second refractive-index contrast that is greater than the first refractive-index contrast.

19. The projector of claim 17 further comprising a plurality of trenches, wherein the plurality of trenches is interleaved with the plurality of output ports.

20. The projector of claim 15 further comprising:
a first plurality of attenuators, each of the first plurality of attenuators being dimensioned and arranged to control the amount of optical energy of one of the first plurality of light signals in the first composite output signal, wherein the first planar lightwave circuit comprises the first plurality of attenuators; and
a second plurality of attenuators, each of the second plurality of attenuators being dimensioned and arranged to control the amount of optical energy of one of the second plurality of light signals in the second composite output signal, wherein the second planar lightwave circuit comprises the second plurality of attenuators.

21. A projector comprising:
a beam combiner comprising a plurality of waveguides that are monolithically integrated, the plurality of waveguides being arranged to define;
    a plurality of input ports that receive a first plurality of light signals having a first polarization;
    a mixing region that is dimensioned and arranged to combine the first plurality of light signals into a first composite output signal;
    a distributor that distributes the first composite output signal into a first signal in a first waveguide and a second signal in a second waveguide;
    a polarization rotator, wherein the polarization rotator converts the first signal to a third signal having a second polarization; and
    an output port that provides each of the first signal and the third signal.

22. A method comprising:
receiving a first plurality of light signals at a first plurality of input ports of a beam combiner, wherein the first plurality of light signals are polarized with a first polarization, and wherein the beam combiner comprises a first planar lightwave circuit that includes the first plurality of input ports, a second plurality of input ports, and an output port;
receiving a second plurality of light signals at the second plurality of input ports, wherein the second plurality of light signals are polarized with a second polarization;
providing an output signal at the output port, wherein the output signal comprises the first plurality of light signals and the second plurality of light signals; and
scanning the output signal over a display region.

23. The method of claim 22 further comprising:
providing the beam combiner such that the first planar lightwave circuit further comprises a first mixing region and a second mixing region;
combining the first plurality of light signals in the first mixing region to provide a first composite output signal;

combining the second plurality of light signals in the second mixing region to provide a second composite output signal; and providing the output signal such that it includes the first composite output signal and the second composite output signal.

24. The method of claim 23 further comprising:

providing the first composite output signal at a first output facet, wherein the output port comprises the first output facet;

providing a first output beam by substantially collimating the first composite output signal;

providing the second composite output signal at a second output facet, wherein the output port comprises the second output facet; and providing a second output beam by substantially collimating the second composite output signal;

wherein the output signal comprises the first output beam and the second output beam.

25. The method of claim 23 further comprising:

providing the beam combiner such that the first planar lightwave circuit further comprises a third mixing region;

combining the first composite output signal and the second composite output signal in the third mixing region to provide a third composite output signal;

providing the output signal such that it includes the third composite output signal; and providing an output beam by substantially collimating the third composite output signal;

wherein the output signal comprises the third output beam.

26. The method of claim 22 further comprising:

controlling a first attenuator to control the intensity of one of the first plurality of light signals in the output signal, wherein the first planar lightwave circuit comprises the first attenuator.

27. The method of claim 22 further comprising:

receiving a third plurality of light signals at plurality of converters, wherein the third plurality of light signals are polarized with the first polarization;

converting the polarization of the third plurality of light signals to the second polarization; and providing the third plurality of light signals having the second polarization as the second plurality of light signals.

28. The method of claim 22 further comprising:

providing a first set of data based on a desired illumination of a first image pixel in the display region;

providing a first set of control signals that control the intensities of each of the first plurality of light signals, wherein the first set of control signals are based on the first set of data, and wherein the first set of control signals are provided at a first time, t0; and providing a second set of control signals that control the intensities of each of the second plurality of light signals, wherein the second set of control signals are based on the first set of data, and wherein the second set of control signals are provided at a second time, t0+$\Delta$t, where the magnitude of $\Delta$t is based on the scan rate at which the output signal is scanned over the display region.

* * * * *